United States Patent
Badola

(10) Patent No.: US 10,524,028 B1
(45) Date of Patent: Dec. 31, 2019

(54) VALIDATING LIVE METERING SERVICE IN A CLOUD INFRASTRUCTURE

(71) Applicant: Nutanix, Inc., San Jose, CA (US)

(72) Inventor: Manoj Badola, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/254,635

(22) Filed: Jan. 23, 2019

(51) Int. Cl.
- *H04Q 9/00* (2006.01)
- *H04L 29/08* (2006.01)
- *G06Q 30/04* (2012.01)

(52) U.S. Cl.
CPC ............... *H04Q 9/00* (2013.01); *G06Q 30/04* (2013.01); *H04L 67/10* (2013.01); *H04Q 2209/60* (2013.01)

(58) Field of Classification Search
CPC . H04L 43/04; H04L 41/5035; H04L 67/1097; H04L 67/10; H04Q 9/00; H04Q 2209/60; G06Q 30/04
USPC ..................................................... 340/870.07
See application file for complete search history.

(56) References Cited

U.S. PATENT DOCUMENTS

| | | | |
|---|---|---|---|
| 8,005,457 B2 | 8/2011 | Jones | |
| 8,874,732 B1 | 10/2014 | Sukumaran et al. | |
| 9,110,496 B1 * | 8/2015 | Michelsen | G06F 1/00 |
| 9,203,709 B2 * | 12/2015 | Beaty | H04L 67/1097 |
| 2014/0136689 A1 * | 5/2014 | Beaty | H04L 67/1097 |
| | | | 709/224 |
| 2014/0136707 A1 * | 5/2014 | Beaty | H04L 67/1097 |
| | | | 709/226 |
| 2014/0292510 A1 * | 10/2014 | Cholhan | H04W 4/90 |
| | | | 340/539.13 |
| 2015/0254740 A1 * | 9/2015 | Akolkar | B01F 7/00033 |
| | | | 705/34 |
| 2015/0278066 A1 * | 10/2015 | France | G06F 11/3452 |
| | | | 709/224 |
| 2015/0341229 A1 * | 11/2015 | Richter | H04L 67/10 |
| | | | 709/224 |
| 2018/0027128 A1 | 1/2018 | Balakrishnan et al. | |

(Continued)

FOREIGN PATENT DOCUMENTS

KR 20130036522 A 4/2013

OTHER PUBLICATIONS

Validate the Accuracy of Your Data Usage Meter, https://www.atso.com/broadband/usage-meter-analysis/, downloaded circa Dec. 20, 2018, pp. 1-6.

(Continued)

*Primary Examiner* — Ojiako K Nwugo
(74) *Attorney, Agent, or Firm* — IPHorizons PLLC; Narendra Reddy Thappeta

(57) ABSTRACT

An aspect of the present disclosure facilitates validating live metering service in a cloud infrastructure. In one embodiment, a testing server receives a request to validate metering of a specific cloud (hosted in a cloud infrastructure) during processing of user requests, and in response collects from a metering service of the cloud infrastructure, measured values representing the actual resources consumed by a reference cloud provisioned in the cloud infrastructure in corresponding durations. The testing server compares the measured values with corresponding reference values expected during the operation of the reference cloud in the corresponding durations and sends a response to the request based on a result of the comparison.

20 Claims, 11 Drawing Sheets

(56) References Cited

U.S. PATENT DOCUMENTS

| | | | |
|---|---|---|---|
| 2018/0211292 A1* | 7/2018 | Fang | G06Q 30/04 |
| 2018/0253637 A1* | 9/2018 | Zhu | H04L 67/22 |
| 2018/0287898 A1* | 10/2018 | Bellini, III | H04L 41/5096 |
| 2018/0365607 A1* | 12/2018 | Manouchehri | G06Q 10/0631 |
| 2019/0034957 A1* | 1/2019 | Koryakin | G06Q 30/0239 |
| 2019/0147646 A1* | 5/2019 | Fan | G06T 17/05 |
| | | | 340/539.13 |

OTHER PUBLICATIONS

Usage Meter Accuracy Analysis, https://go.atso.com/hubfs/Business_Cases/ISP_Usage_Meter_Accuracy_Business_Case.pdf, downloaded circa Dec. 20, 2018, pp. 1-2.

G.Ranjith, M.Vinoth, An Unified Approach for Effective Use of Cloud Metering Service, International Journal of Pure and Applied Mathematics, date 2018, pp. 801-806, vol. 118 No. 9, ISSN: 1311-8080.

* cited by examiner

450

HH:MM - Action
471 → 00:03 - Create VM1 <2x, 4GB, 70GB>
472 → 00:10 - Create VM2 <1x, 2GB, 150GB>
473 → 00:17 - Power ON VM1
474 → 00:20 - Power ON VM2
00:44 - Power OFF VM1
00:52 - Power OFF VM2
01:16 - Power ON VM1
478 → 01:18 - Edit VM2 <4x, 8GB, 200GB>
01:20 - Power ON VM2
01:35 - Clone VM1 as VM3
01:36 - Power ON VM3
01:50 - Power OFF VM3
01:55 - Delete VM3
02:10 - Power OFF VM1, VM2
02:12 - Delete VM1, VM2

| Time | Tenant | VM | Action |
|---|---|---|---|
| 8:30 | TE2 | VM11 | Create |
| 8:30 | TE2 | VM9 | Create |
| 8:31 | TE2 | VM10 | Create |
| 8:32 | TE2 | VM9 | Power ON |
| 8:33 | TE2 | VM10 | Power ON |
| 8:33 | TEST | VM1 | Create |
| 8:34 | TE1 | VM13 | Create |
| 8:35 | TE2 | VM16 | Clone VM11 |
| 8:36 | TE3 | VM23 | Create |
| 8:37 | TE1 | VM18 | Create |
| 8:38 | TE1 | VM13 | Power ON |
| 8:38 | TE2 | VM21 | Clone VM9 |
| 8:38 | TE1 | VM18 | Power ON |
| 8:39 | TE2 | VM11 | Create |
| 8:40 | TEST | VM2 | Power ON |
| 8:41 | TE3 | VM23 | Create |
| 8:42 | TE1 | VM28 | Clone VM13 |

| Time | Tenant | VM | Action |
|---|---|---|---|
| 8:42 | TE2 | VM9 | Power OFF |
| 8:43 | TE2 | VM10 | Power OFF |
| 8:44 | TE1 | VM29 | Clone VM18 |
| 8:45 | TE1 | VM30 | Clone VM18 |
| 8:46 | TE1 | VM13 | Power ON |
| 8:47 | TEST | VM1 | Power ON |
| 8:48 | TE2 | VM9 | Power ON |
| 8:48 | TE1 | VM13 | Power ON |
| 8:49 | TE3 | VM31 | Clone VM23 |
| 8:50 | TEST | VM2 | Power ON |
| 8:51 | TE1 | VM18 | Power OFF |
| 8:52 | TE3 | VM23 | Power ON |
| 8:53 | TE3 | VM31 | Power OFF |
| 8:54 | TE2 | VM9 | Delete |
| 8:55 | TE3 | VM23 | Power ON |
| 8:56 | TE2 | VM21 | Power OFF |
| 8:57 | TE1 | VM28 | Create |
| 8:58 | TE3 | VM32 | Power OFF |
| 8:59 | TE1 | VM13 | ... |
| 9:00 | TE2 | VM9 | Delete |

FIG. 6

700 — TE2 (usage in min)

| Duration | VM9 <2x, 2GB, 100GB> | VM10 <2x, 2GB, 100GB> | VM11 <3x, 4GB, 100GB> | VM16 <3x, 4GB, 100GB> | VM21 <2x, 2GB, 100GB> |
|---|---|---|---|---|---|
| 8:30-8:45 | 10, 10, 15 | 10, 10, 14 | 6, 6, 15 | ... | ... |
| 8:45-9:00 | 6, 6, 15 | ... | 15, 15, 15 | ... | ... |
| 9:00-9:15 | ... | ... | 10, 10, 15 | ... | ... |
| 9:15-9:30 | ... | ... | 0, 0, 5 | ... | 4, 4, 5 |

750 — TEST (usage in min)

| Duration | VM1 <2x, 4GB, 70GB> | VM2 <1x, 2GB, 150GB> | VM2 <4x, 8GB, 200GB> | VM3 <2x, 4GB, 70GB> |
|---|---|---|---|---|
| 8:30-8:45 | 0, 0, 12 | 0, 0, 5 | | |
| 8:45-9:00 | 13, 13, 15 | 10, 10, 15 | | |
| 9:00-9:15 | 14, 14, 15 | 15, 15, 15 | | |
| 9:15-9:30 | 0, 0, 15 | 7, 7, 15 | | |
| 9:30-9:45 | 0, 0, 15 | | | |
| 9:45-10:00 | 14, 14, 15 | | 10, 10, 12 | |
| 10:00-10:15 | 15, 15, 15 | | 15, 15, 15 | 9, 9, 10 |
| 10:15-10:30 | 15, 15, 15 | | 15, 15, 15 | 5, 5, 10 |
| 10:30-10:45 | 10, 10, 12 | | 10, 10, 12 | |
| 10:45-11:00 | | | | |

↑ 755
↑ 757

741, 742

VALIDATING LIVE METERING SERVICE IN A CLOUD INFRASTRUCTURE

BACKGROUND OF THE DISCLOSURE

Technical Field

The present disclosure relates to cloud computing, and more specifically to validating live metering service in a cloud infrastructure.

Related Art

Cloud infrastructure refers to a collection of processing nodes, connectivity infrastructure, data storages, etc., which are engineered to together provide a respective virtual infrastructure (typically computing and storage) for various customers, with the scale of such virtual infrastructure being specified often on demand.

Cloud refers to the virtual infrastructure provided for a specific customer/tenant. Each tenant may host desired applications/data services on their cloud(s), which are capable of processing user requests received from end user systems. Many vendors such as Amazon, Google, Microsoft, etc., have corresponding public cloud infrastructures based on which clouds are provided for respective customers/tenants.

Metering service is provided to measure the resources (e.g., memory, compute cycles, storage) consumed by a cloud. Such metering is the basis for checking compliance to SLAs (service level agreements) with customers, billing for resources consumed per cloud/tenant, etc.

Live metering refers to metering of the cloud when the cloud is processing user requests. In other words, live metering is performed concurrent with the processing of the user requests.

There is a general need to validate such live metering services at least to ensure that the measurements captured by the metering service for each cloud/tenant are accurate.

BRIEF DESCRIPTION OF THE DRAWINGS

Example embodiments of the present disclosure will be described with reference to the accompanying drawings briefly described below.

FIG. 6 depicts portions of resource information collected in a cloud infrastructure in one embodiment.

FIG. 7A depicts portions of resource usage data maintained in a cloud infrastructure in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
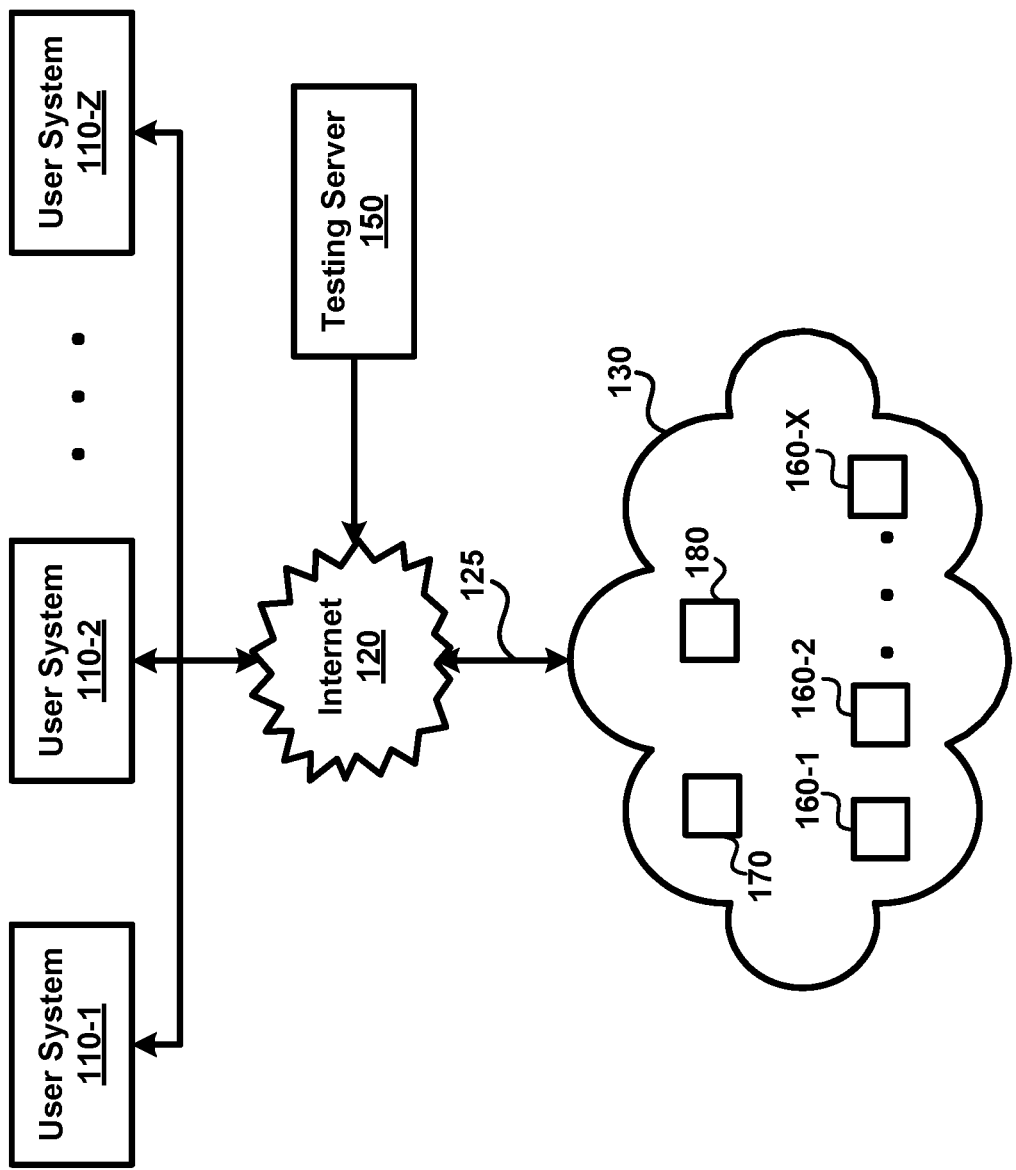
FIG. 1 is a block diagram illustrating an example environment (computing system) in which several aspects of the present invention can be implemented.

An aspect of the present disclosure facilitates validating live metering service in a cloud infrastructure. In one embodiment, a testing server receives a request to validate metering of a specific cloud (hosted in a cloud infrastructure) during processing of user requests. In response, the testing server collects from a metering service of the cloud infrastructure, measured values representing the actual resources consumed by a reference cloud provisioned in the cloud infrastructure in corresponding durations. The testing server compares the measured values with corresponding reference values expected during the operation of the reference cloud in the corresponding durations and sends a response to the request based on a result of comparing. The response may indicate whether the metering of the specific cloud is accurate or not.

Thus, the live metering (during processing of user requests by various clouds) in a cloud infrastructure is facilitated to be validated. By using a reference cloud, the validation is performed without any adverse effect on the performance of the specific cloud (whose metering is sought to be validated).

According to another aspect of the present disclosure, a test cloud is created in the cloud infrastructure, with the test cloud designed to consume resources according to a test specification. The test cloud is used as the reference cloud noted above and the test specification is used to determine the reference values. The test cloud is separate and distinct from the specific cloud (whose metering is sought to be validated). The term "separate and distinct" used in the context of two clouds (here, test cloud and specific cloud) hosted in a cloud infrastructure implies that the two clouds have corresponding unique identities (e.g. names, access points) in the cloud infrastructure and are managed independently of each other.

According to one more aspect of the present disclosure, the creation of the test cloud in a cloud infrastructure is performed in response to receipt of a request to validate metering of a specific cloud (hosted in the cloud infrastructure) during processing of user requests. The test specification (used for creation of the test cloud) is different from a specification of the specific cloud. In one embodiment, the request is received from a tenant owning the specific cloud.

According to yet another aspect of the present disclosure, the test specification (used for creation of the test cloud)

specifies usage of resources to model the dynamic usage of resources by the specific cloud (whose metering is sought to be validated). The term "dynamic" entails capturing the changes to the usage of resources by the specific cloud during different durations.

According to an aspect of the present disclosure, each cloud hosted in a cloud infrastructure, including the specific cloud and test cloud noted above, contain one or more virtual machines provisioned in nodes of the cloud infrastructure. A test specification (used for creation of the test cloud) specifies provisioning operations for the virtual machines contained in the test cloud. The provisioning operations may reflect the dynamic usage of resources by the specific cloud.

In one embodiment, the provisioning operations for a virtual machine is one or more of create the virtual machine according to a resource definition, power-on the virtual machine, power-off the virtual machine, delete the virtual machine, clone the virtual machine and edit the resource definition of the virtual machine.

In one embodiment, the resources used by a cloud is one or more of memory allocated to each virtual machine in the cloud, CPU (central processing unit) cycles used by each virtual machine in the cloud, storage allocated to each virtual machine in the cloud, and public IP (Internet Protocol) addresses used by the cloud.

According to another aspect of the present disclosure, a metering service of a cloud infrastructure measures resource usage in a sequence of metering intervals, with the resource usage by a cloud being billed for each billing interval having multiple metering intervals. As such, when a request to validate metering of a specific cloud (hosted in a cloud infrastructure) is received at a time instance, a test server performs the collecting of measured values for corresponding durations (noted above) starting from a next metering interval following the time instance such that each of the corresponding durations aligns with a respective metering interval of the sequence of metering intervals. Such aligning of the durations with the metering intervals ensures that the validation of the metering service is more accurate.

According to an aspect of the present disclosure, a digital processing system creates a test cloud in a cloud infrastructure, the test cloud designed to consume resources according to a test specification. The system collects from a metering service of the cloud infrastructure, measured values representing the actual resources consumed by the test cloud in corresponding durations. The system also computes based on the test specification, reference values representing the resources expected to be consumed by the test cloud in corresponding durations. The system then determines that the metering service (of the cloud infrastructure) is accurate if the measured values match the expected values in the corresponding durations.

In one embodiment, the system performs the above noted actions of creating, collecting, computing and determining in response to receiving a request to validate metering of a specific cloud during processing of user requests, the specific cloud being hosted in the cloud infrastructure and being separate and distinct from the test cloud.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present invention can be implemented. The block diagram is shown containing user systems 110-1 through 110-Z (Z representing any integer), Internet 120, testing server 150, and cloud infrastructure 130. Cloud infrastructure 130 in turn is shown containing nodes 160-1 through 160-X (X representing any integer), administration systems 170 and 180. The user systems and nodes are collectively referred to by 110 and 160 respectively.

Merely for illustration, only representative number/type of systems are shown in FIG. 1. Many environments often contain many more systems, both in number and type, depending on the purpose for which the environment is designed. Each block of FIG. 1 is described below in further detail.

Cloud infrastructure 130 is a collection of processing nodes (160), connectivity infrastructure, data storages, administration systems (170 and 180), etc., which are engineered to together provide a virtual computing infrastructure for various customers, with the scale of such computing infrastructure being specified often on demand.

All the systems (e.g. 160, 170 and 180) of cloud 130 are assumed to be connected via an intranet. Internet 120 extends the connectivity of these (and other systems of the cloud) with external systems such as user systems 110 and testing server 150. Each of intranet and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies a target application, the packet may be said to be directed to such application as well.

Each of user-systems 110 represents a system such as a personal computer, workstation, mobile device, computing tablet etc., used by users to generate (user) requests directed to enterprise applications executing in cloud infrastructure 130. The user requests may be generated using appropriate user interfaces (e.g., web pages provided by an enterprise application executing in a node, a native user interface provided by a portion of an enterprise application downloaded from a node, etc.).

In general, a user system requests an enterprise application for performing desired tasks and receives the corresponding responses (e.g., web pages) containing the results of performance of the requested tasks. The web pages/responses may then be presented to the user by user applications such as the browser. Each user request is sent in the form of an IP packet directed to the desired system or enterprise application, with the IP packet including data identifying the desired tasks in the payload portion.

Some of nodes 160 may be implemented as corresponding data stores. Each data store represents a non-volatile (persistent) storage facilitating storage and retrieval of enterprise by applications executing in the other systems/nodes of cloud infrastructure 130. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 160 may be implemented as corresponding server systems. Each server system represents a server, such as a web/application server, executing enterprise applications capable of performing tasks requested by users using user system 110. A server system receives a client request from a user system and performs the tasks requested in the user request. A server system may use data stored internally (for example, in a non-volatile storage/hard disk within the server system), external data (e.g., maintained in a data store) and/or data received from external sources (e.g., from the user) in performing the requested tasks. The server system then sends the result of performance of the tasks to the requesting user system (one of 110) as a corresponding response to the user request. The results may be accompanied by specific user interfaces (e.g., web pages) for displaying the results to the requesting user.

Each of nodes 160 has a fixed number of resources such as memory (RAM), CPU (central processing unit) cycles, persistent storage, etc. that can be allocated to (and accordingly used by) entities executing in the node. Other resources that may also be provided associated with the cloud infrastructure (but not specific to a node) include public IP (Internet Protocol) addresses, etc. Resource usage of such cloud specific resources is needed to be metered and billed as well.

Each of administration systems 170 and 180 represents a server, such as a web/application server that executes administration services for the cloud infrastructure. Example of administration services include but are not limited to a data collector service that collects resource information from nodes 160, a metering service that measures the resources used in the cloud infrastructure during corresponding duration, a billing service that bills customers/tenants based on the usage of resources in the cloud infrastructure, etc.

In one embodiment, each customer/tenant is provided with a corresponding virtual computing infrastructure (referred to as a "cloud") hosted on the nodes of cloud infrastructure 130. Each tenant may host desired applications/data services on their cloud(s), which are capable of processing user requests received from user system 110. The manner in which clouds may be hosted in a cloud infrastructure is described below with examples.

3. Hosting Clouds in a Cloud Infrastructure

In one embodiment, virtual machines (VMs) form the basis for executing various enterprise applications in processing nodes/server systems of cloud infrastructure 130. As is well known, a virtual machine may be viewed as a container in which enterprise applications are executed. A processing node/server system can host multiple virtual machines, and the virtual machines provide a view of a complete machine (computer system) to the enterprise applications executing in the virtual machine. Thus, when multiple VMs are hosted on a single node, the resources (of the node) are shared by the VMs FIG. 2A illustrates an example state of a node in a cloud infrastructure. Node 160-1 is shown hosting VMs 211, 212, 213 and 214, with the resources of the node shown allocated among the four VMs and some resources shown as still remaining 'unused'. Each of VMs 211-214 is associated with a corresponding resource definition which specifies the resources required for/used by the VM during its operation. The resource definition typically is in the form of a triplet <C, M, S>, where C is the number of CPU cycles (e.g. 1x, 2x, 4x), M is the amount of memory (RAM) in gigabytes (e.g. 1 GB, 2 GB, 4 GB) and S is the amount of persistent storage in gigabytes (e.g. 50 GB, 100 GB, 200 GB).

In one embodiment, a cloud for a customer/tenant is provisioned (created) by allocating a desired number of VMs hosted on nodes 160 in cloud infrastructure 130. Each VM in the cloud may have a corresponding resource definition. Multiple VMs may also have the same resource definition. The manner in which multiple clouds are provisioned in cloud infrastructure 130 is described below with examples.

Figure 2B:
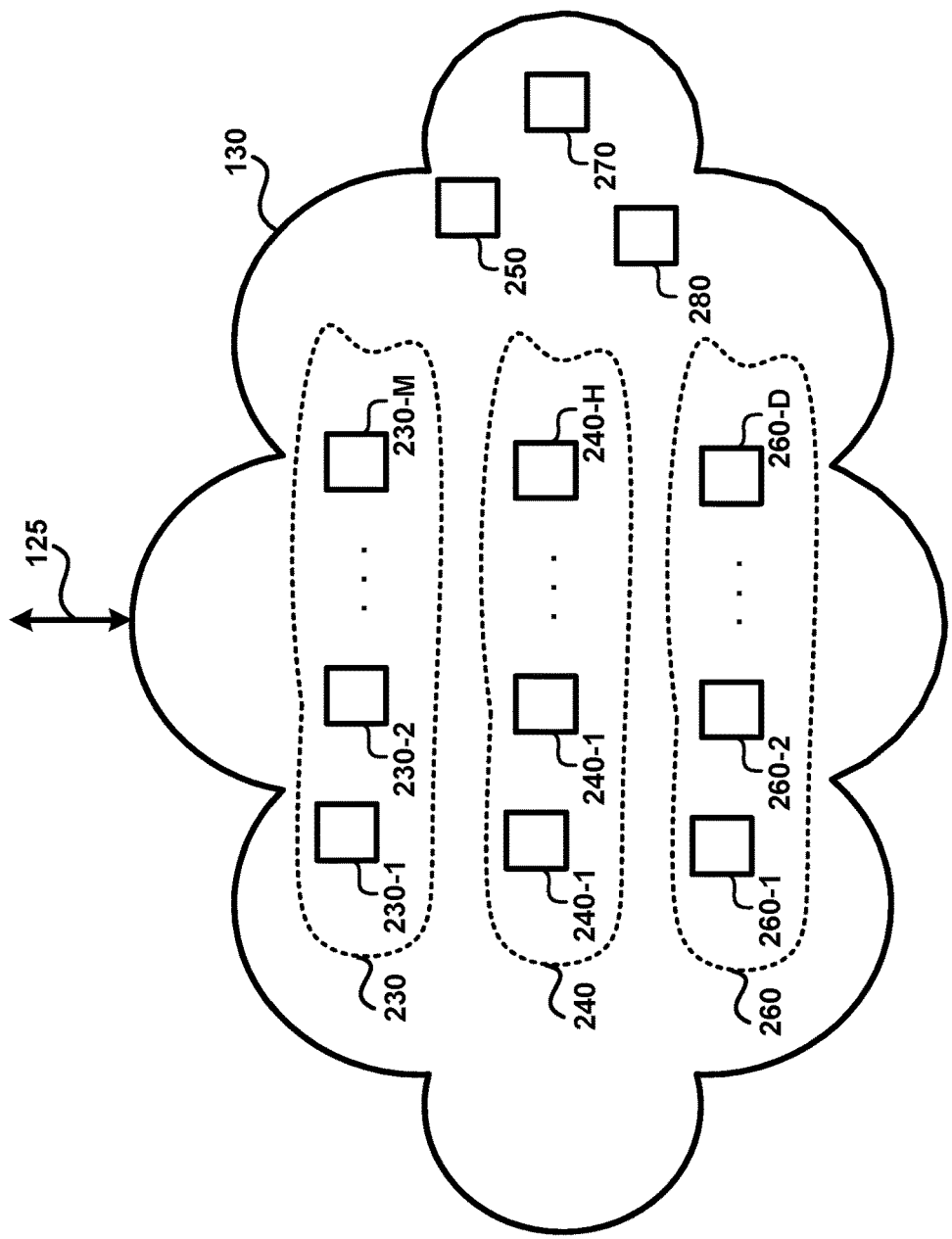
FIG. 2B illustrates the manner in which clouds are hosted in a cloud infrastructure in on embodiment.
Figure 2A:
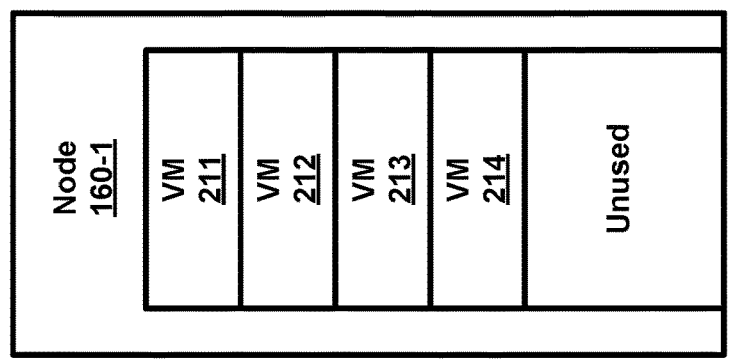
FIG. 2A illustrates an example state of a node in a cloud infrastructure.

FIG. 2B illustrates the manner in which clouds are hosted in a cloud infrastructure in on embodiment. Specifically, cloud infrastructure 130 is shown hosting clouds 230, 240 and 260. Cloud 230 is shown containing VMs 230-1 through 230-M (M representing any integer) that may be provisioned on the different nodes 160 of cloud infrastructure 130. Similarly, clouds 240 and 260 are shown respectively containing VMs 240-1 through 240-H and 260-1 through 260-D (H and D representing any integer). For illustration, it is assumed that each cloud (230, 240 and 260) is owned by a corresponding customer/tenant.

A customer/tenant owning a cloud typically specifies the desired number of VMs to be part of the cloud. The tenant may change (increase or decrease) the number and/or resource definition of the VMs at any desired time. Such changes may be due to change in the number of user requests received from user systems 110, change in the time taken to process the user requests, addition or removal of enterprise applications (or instances thereof), change in the amount of data maintained, etc.

Data collector service 250, assumed to be executing in administration system 170, collects resource information from nodes 160, in particular, in relation to the VMs executing in the nodes. The resource information may include the resources (the triplet <C, M, S> noted above) allocated to each VM executing in the nodes 160. The resource collection is performed at regular intervals (typically, every 1 minute, hereinafter "collection interval") to capture the dynamic usage of resources by different clouds hosted in cloud infrastructure 130.

Metering service 270, assumed to be executing in administration system 170, measures the resources used by each cloud (230, 240, 260) in cloud infrastructure during corresponding durations. As the metering is performed concurrent with the (enterprise applications executing in the) cloud processing the user requests received from users 110, the metering is referred to as "live metering".

In one embodiment, such measurement is performed based on the resource information collected by data collector service 250. Data collector service 250 stores the collected resource information in a persistent storage (internal to administration system 170 or on one of nodes 160 operating as a data store), with metering service 270 then determining the resources used by each cloud and aggregating the usage for larger intervals (e.g. 15 minutes, hereinafter referred to as "metering intervals"). Metering service 270 may maintain the measured resource usage data in a persistent storage (internal to administration system 170 or on one of nodes 160 operating as a data store). Metering service 270 also forwards the measured values to billing service 280.

Billing service 280, assumed to be executing in administration system 180, bills customers/tenants based on the usage of resources by their cloud in cloud infrastructure 130. Billing service 280 receives the measured values from metering service 270, and aggregates the received values for larger intervals (e.g. hourly, daily, etc. hereinafter referred to as "billing intervals"), and then bills the customer/tenant based on a rate/cost associated with each resource.

Thus, a customer/tenant is billed according to the dynamic usage of resources by their cloud in cloud infrastructure 130. However, in some scenarios, a customer/tenant may wish to validate whether the metering (in turn, the billing) of the resource usage of their cloud is accurate.

Testing server 150, provided according to several aspects of the present disclosure, facilitates validating live metering service (270) in cloud infrastructure (130). Though testing server 150 is shown external to cloud infrastructure 130, in alternative embodiments, testing server 150 may be implemented internal to cloud infrastructure 130, for example, in one of nodes 160 or as a corresponding service executing on administration systems 170/180. The manner in which testing server 150 facilitates validating live metering service is described below with examples.

3. Validating Live Metering Service in Cloud Infrastructure

Figure 3:
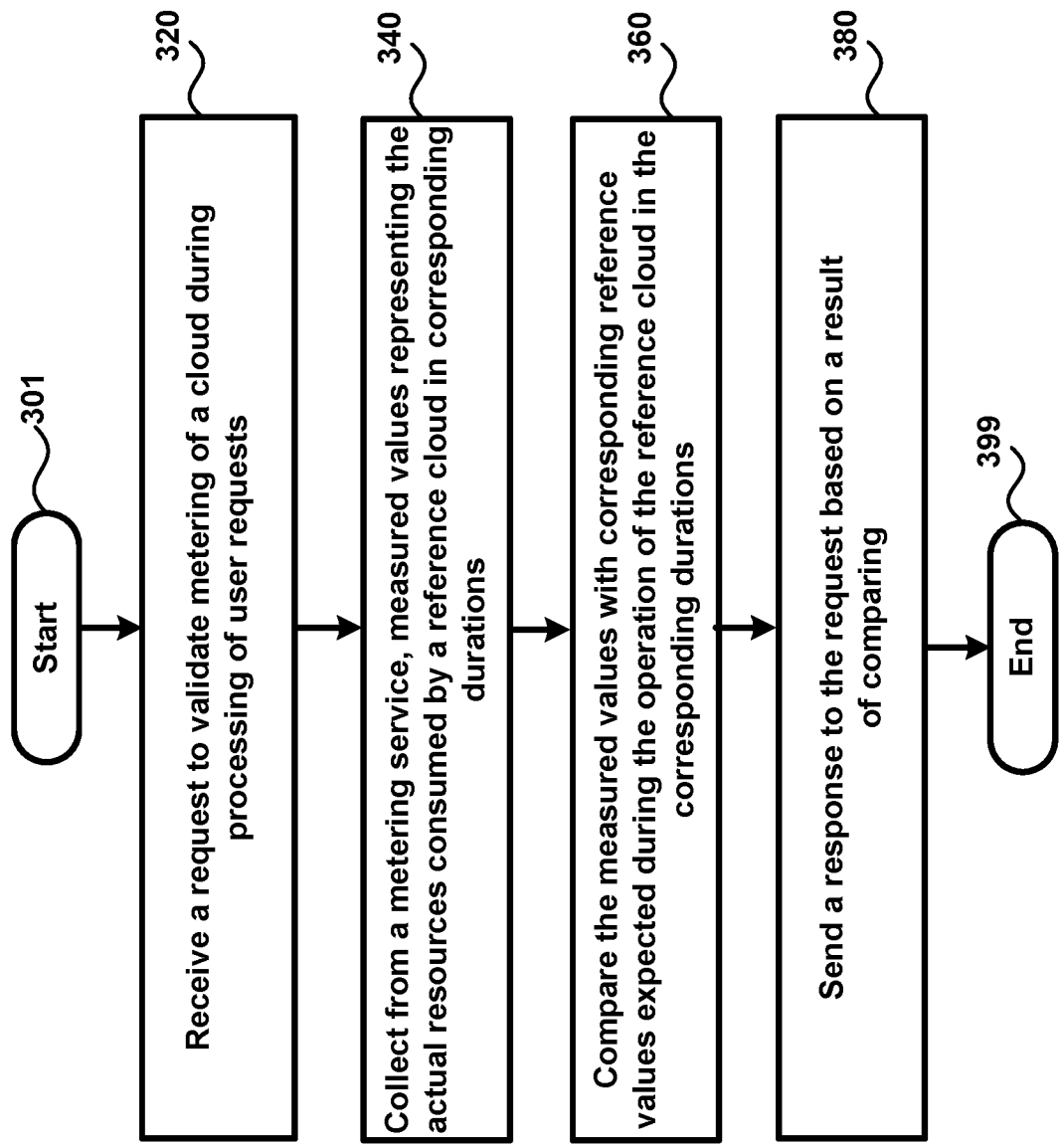
FIG. 3 is a flow chart illustrating the manner in which validating live metering service in a cloud infrastructure is performed according to an aspect of the present disclosure.

FIG. 3 is a flow chart illustrating the manner in which validating live metering service in a cloud infrastructure is performed according to an aspect of the present disclosure. The flowchart is described with respect to the systems of FIGS. 1 and 2, in particular testing server 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 320.

In step 320, testing server 150 receives a request to validate metering of a cloud (assumed to be 240 for illustration) during processing of user requests, the cloud being hosted in a cloud infrastructure (130). The request may include details of the cloud such as the VMs in the cloud, the specification of each VM, etc. The request may be received from a customer/tenant owning the cloud (240) using one of user systems 110.

In step 340, testing server 150 collects from a metering service (270) of the cloud infrastructure, measured values representing the actual resources consumed by a reference cloud provisioned in cloud infrastructure 130 in corresponding durations. The collecting may entail sending requests at regular intervals to metering service 270, and receiving the measured values as responses to the request. Alternatively, metering service 270 may be configured to push/send the measured values to testing server 150 at regular intervals.

According to an aspect, in response to receiving the request in step 320, testing server 150 creates a test cloud (in cloud infrastructure 130) designed to consume resources according to a test specification, and then uses the test cloud as the reference cloud. The test cloud is separate and distinct from the cloud (240) whose metering is sought to be validated. The test specification may be different from the specification of the cloud (240).

In step 360, testing server 150 compares the measured values with corresponding reference values expected during the operation of the reference cloud in the corresponding durations. The reference values may be pre-determined based on a specification of the reference cloud. When a test cloud is used as the reference cloud, the corresponding test specification is used to determine the reference values. In one embodiment, the reference values are computed based on the test specification.

In step 380, testing server 150 sends a response to the request (received in step 320) based on a result of comparing. Specifically, the response indicates whether the metering of the cloud is accurate or not. In one embodiment, the result of comparing specifies whether the measured values match the respective reference values in corresponding durations. Accordingly, the response indicates that the metering of the cloud is accurate if the result specifies a match, and inaccurate otherwise. The flowchart ends in step 299.

It may be appreciated that match (with an acceptable margin of error) of the measured values and the reference values for the reference cloud indicates the accuracy of the metering service cloud infrastructure 130 in general. By extension, metering of the specific cloud 240 is also deemed to be accurate as the same metering service is being used for live metering/billing of specific cloud 240.

Thus, a customer/tenant of a cloud (240) is facilitated to validate whether the metering (in turn, the billing) of the resource usage of their cloud is accurate. It may be appreciated that the operation of FIG. 3 facilitates to validate the metering service (270) of the cloud infrastructure (130) as well. The manner in which a test/reference cloud is provisioned in a cloud infrastructure is illustrated below with examples.

4. Test/Reference Cloud

Figure 4A:
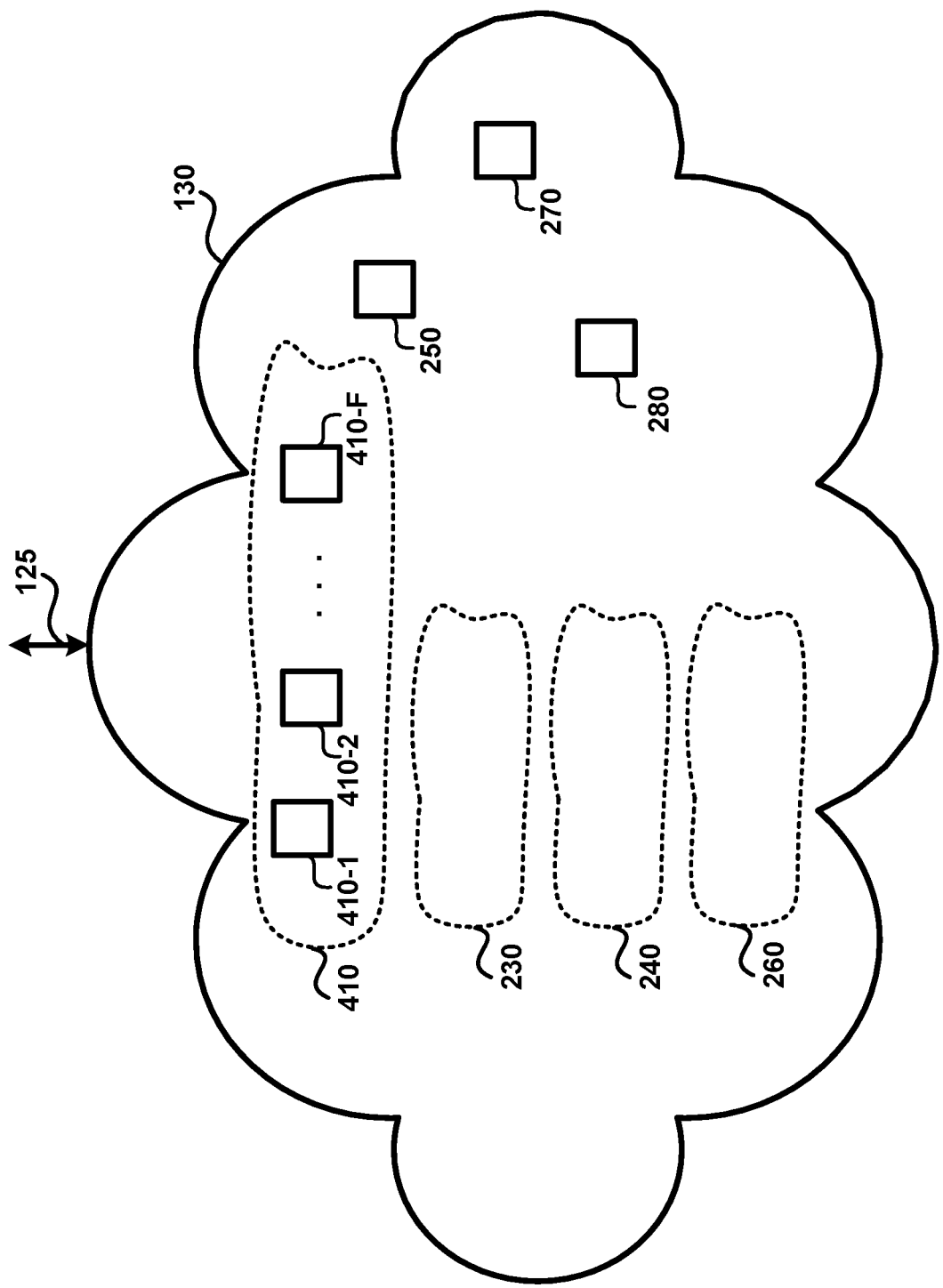
FIG. 4A illustrates the manner in which a test/reference cloud is provisioned in a cloud infrastructure in one embodiment.

FIG. 4A illustrates the manner in which a test/reference cloud is provisioned in a cloud infrastructure in one embodiment. Cloud infrastructure 130 is shown hosting clouds 230, 240 and 260, in addition to data collector service 250, metering service 270 and billing service 280 similar to FIG. 2A. In addition, cloud infrastructure 130 is shown hosting a test/reference cloud 410 containing VMs 410-1 through 410-F (F representing any integer) that may be provisioned on the different nodes 160.

According to an aspect of the present disclosure, test cloud 410 is created in cloud infrastructure 130 in response to receipt of a request to validate metering of a cloud (240) hosted in cloud infrastructure (130) during processing of user requests. In one embodiment, the request is received from a tenant owning the specific cloud.

Test cloud 410 is designed to consume resources according to a test specification. In particular, the test specification specifies the number of VMs and the resource definition of each VM of test cloud 410. The test specification (used for creation of test cloud 410) may be different from a specification of cloud 240. It may be readily observed that test cloud 410 is separate and distinct from cloud (240) whose metering is sought to be validated. An example test specification is described below with examples.

Figures 4B, 5:
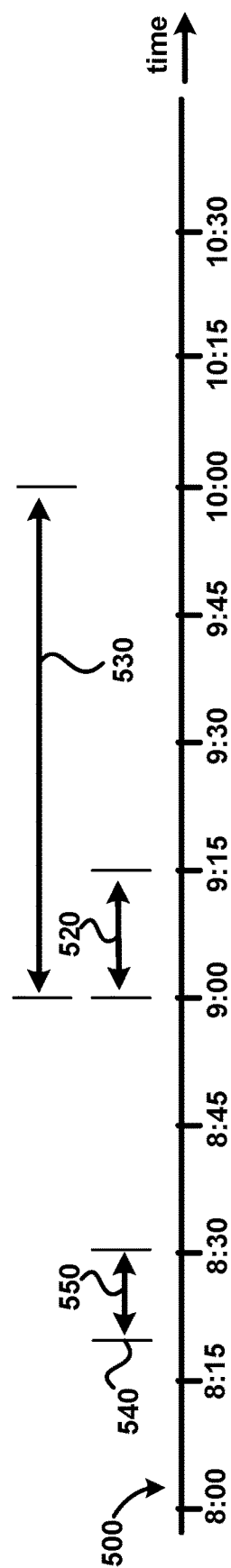
FIG. 4B is an example test specification for provisioning a test/reference cloud in a cloud infrastructure.
FIG. 5 is a timeline according to which the resource usage of a cloud infrastructure is monitored in one embodiment.

FIG. 4B is an example test specification for provisioning a test/reference cloud in a cloud infrastructure. Data portion 450 depicts a portion of an example test specification according to which test cloud 410 is provisioned in cloud infrastructure 130. Each line (such as 471-474 and 478) of data portion 450 specifies a time instance (0:03, 0:10, 0:17, etc.) and the corresponding provisioning operation to be performed in relation to the VMs of test cloud 410 at the time instance. The time instances are specified as hours and minutes from a start time instance when the test cloud is provisioned in cloud infrastructure 130.

The provisioning operations include but are not limited to: Create a new virtual machine (e.g. VM1, VM2, etc.) according to a resource definition (shown in triplet), Power ON an created virtual machine, Power OFF a powered-on virtual machine, Delete an existing virtual machine, Clone an existing virtual machine and Edit the resource definition of an existing virtual machine to a new resource definition (again triplet). Other provisioning operations may be specified as part of the test specification as will be apparent to one skilled in the relevant arts by reading the disclosure herein.

According to an aspect of the present disclosure, test specification 450 used for creation of test cloud 410 specifies usage of resources to model the dynamic usage of resources by cloud 240 (whose metering is sought to be validated). For example, the provisioning operations in the test specification may be chosen to capture the changes to the usage of resources by cloud 240.

Testing server 150 then provisions test cloud 410 according to the test specification (data portion 450). Such provisioning may entail registering test cloud 410 and the tenant (assumed to be "TEST") with cloud infrastructure 130 and thereafter performing the provisioning actions specified in the test specification (data portion 450). After the performance of the provisioning operations, testing server 150 collects from metering service 270, measured values representing the actual resources consumed by the test cloud in corresponding durations.

As described later from with respect to FIGS. 8A/8B, metering of cloud infrastructure 130 is validated, as a basis for validating the requested cloud 240. It is accordingly helpful to understand the nature of metering in cloud infrastructures. Accordingly, FIGS. 5 through 7B are used to establish the manner in which resource usage can be measured and metered in an embodiment.

5. Metering and Billing Resource Usage

FIG. 5 is a timeline (500) according to which the resource usage of a cloud infrastructure is monitored in one embodiment. In the following description, it is assumed that data collector service 250 collects resource information from nodes 160 every 1 minute (collection interval), and accordingly timeline 500 is shown in minutes (with time instances "8:15", "8:30" etc. shown according to 24 hour format).

Duration 520 represents a metering interval (assumed to be 15 minutes for illustration) according to which resource usage is measured. Thus, metering service 270 measures resource usage in a sequence of metering intervals such as 9:00-9:15, 9:15-9:30, 9:30-9:45, etc. It should be noted that the metering intervals are non-overlapping durations, with 9:00-9:15 representing the time instances in the duration 9:00:01 (:01 representing the seconds) to 9:15:00, and 9:15-9:30 representing the time instances in the duration 9:15:01 to 9:30:00. It may be further appreciated that the billing of the resource usage may be performed at a more general level.

Duration 530 represents a billing interval (assumed to be 1 hour for illustration) according to which resource usage is billed for each cloud and/or tenant. Thus, billing service 280 bills customers/tenants based on the usage of resources by their cloud in each billing interval such as 9:00-10:00 (more specifically 9:00:01 to 10:00:00), 10:00-11:00, 11:00-12:00, etc. Each billing interval (530) contains multiple (here 4) metering intervals.

According to an aspect of the present disclosure, when a request to validate metering of cloud 240 (hosted in cloud infrastructure 130) is received at a time instance, testing server 150 performs the collecting of measured values for corresponding durations starting from a next metering interval following the time instance such that each of the corresponding durations aligns with a respective metering interval of the sequence of metering intervals. In timeline 500, if the request is received at time instance 540 (e.g. 8:20), testing server 150 waits for duration 550 (10 minutes) and then starts the collecting of the measured values from metering server 270 at the next metering interval of 8:30-8:45.

The manner in which resource information is collected and processed with respect to timeline 500 is described below with examples.

FIG. 6 depicts portions of resource information collected in a cloud infrastructure in one embodiment. Though shown in the form of tables, the resource information (and other data portions shown in FIGS. 7A/7B and 8A/8B) may be collected/maintained according to other data formats (such as extensible markup language (XML), etc.) and/or using other data structures (such as lists, trees, etc.), as will be apparent to one skilled in the relevant arts by reading the disclosure herein.

Table 600 depicts a portion of the resource information collected by data collector service 250 from various nodes 160. Specifically, column 611 specifies a corresponding time instance at which the resource information of columns 612-614 is collected. Columns 612-614 respectively specify an identifier of the tenant, identifier of the VM owned/created by the tenant and a corresponding provisioning operation performed with respect to the VM. In the following disclosure, it is assumed that the tenant TE2 is the owner of cloud 240 whose metering is sought to be validated, while tenant TEST is the owner of test cloud 410.

Each of rows of table 600 specifies the details of corresponding resource information collected from nodes 160. Rows 631-644 specifies the resource information collected for VMs (in particular, VM9, VM10, VM11, VM16 and VM21) belonging to tenant TE2, while rows 681-684 specifies the corresponding resource information for VMs (VM1, VM2 and VM3) belonging to TEST tenant. It may be observed that rows 681-684 correspond to the provisioning operations specified in lines 471-474 (with the start time instance being 8:30) of the test specification shown in FIG. 4B. Other rows specify the details of the provisioning operations performed with respect to other tenants such as TE1, TE2, etc.

Thus, data collector service 250 collects resource information from nodes 160. Metering service 270 measures the resources used by each cloud/tenant based on the collected resource information (table 600) as described in detail below.

FIG. 7A depicts portions of resource usage data maintained in a cloud infrastructure in one embodiment. Table 700 depicts a portion of the resource usage data measured/maintained by metering service 270 for tenant TE2. Column 711 specifies a corresponding metering interval for which the resource usage of different VMs shown in columns 712-716 is measured. Each of the cells (at the intersection of a row and a column) in table 700 specifies in the resource usage in minutes of CPU cycles, memory and storage. For example, the cell value "10,10,15" at the intersection of column 712 and row 705 indicates that VM9 has used 10 minutes of (2x) CPU cycles, 10 minutes of (2 GB of) memory and 15 minutes of (100 GB of) storage in the metering interval 8:30-8:45. Similarly, the other cells specify the resource usage data of other VMs belonging to tenant TE2.

It may be appreciated that the CPU and memory usage of a VM is the sum of the durations when the VM is powered on (that is between the provisioning operations of Power ON and Power OFF of the VM). However, the storage usage is based on the duration of existence of the VM that is between the provisional operations of Create and Delete of the VM. In table 700 and 750, a blank (empty) value in the cell indicates no resource usage (i.e., equivalent to "0,0,0"), while a " . . . " (Ellipses) in the cell indicates a resource usage value not shown here for conciseness.

Table 750 depicts another portion of the resource usage data measured/maintained by metering service 270 for tenant TEST (test cloud 410). The structure of table 750 is similar to the structure of table 700, with the cells specifying the resource usage in minutes of CPU cycles, memory and storage for the various VMs belonging to tenant TEST. It may be observed that both columns 741 and 742 specify the resource usage of the same VM2, but with different resource specification in view of the Edit specification provisioning operation specified in line 478 of the test specification of FIG. 4B. Similar resource usage data is also maintained for other tenants such as T1, T3, etc.

Thus, metering service 270 measures resource usage of each cloud/tenant in cloud infrastructure 130. Metering service 270 then forwards the portion of resource usage data shown in FIG. 7A to billing service 280, which in turn computes and bills the customers/tenants based on the metering of their resource usage. The manner in which billing service 280 bills customers/tenants is described in detail below.

Figure 7B:
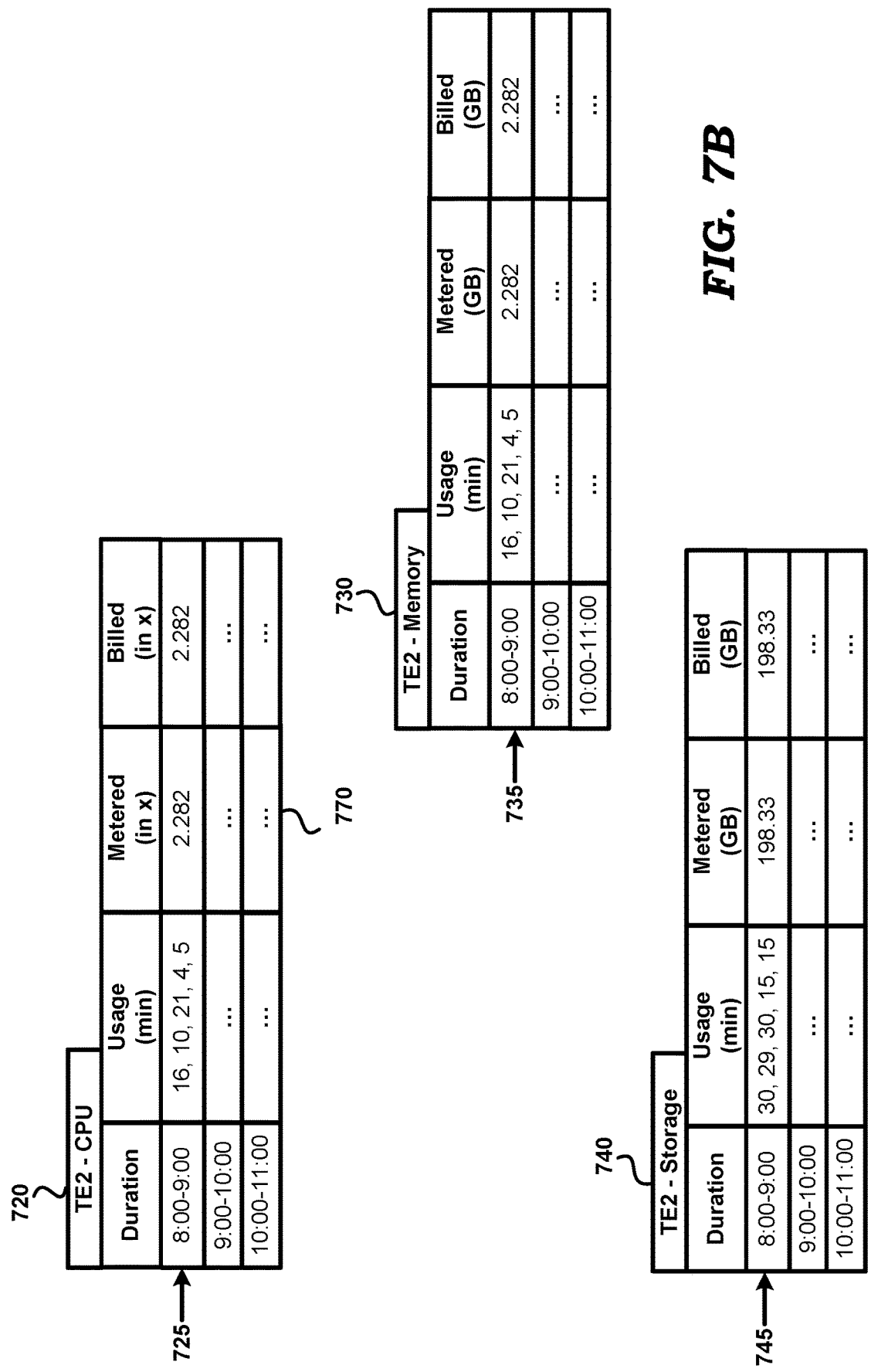
FIG. 7B depicts the manner in which customers/tenants in a cloud infrastructure are billed based on their resource usage in one embodiment.

FIG. 7B depicts the manner in which customers/tenants in a cloud infrastructure are billed based on their resource usage in one embodiment. Tables 720, 730 and 740 specify the manner in which tenant TE2 is billed for the respective usage of CPU cycles, memory and storage.

In table 720, column "Duration" specifies the billing intervals such as 8:00-9:00, 9:00-10:00, etc. Column "Usage (min)" specifies the usage in total number of minutes for each of the VMs (that is, VM9, VM10, VM11, VM16 and VM21) owned by the tenant TE2 in the corresponding billing interval, while columns "Metered (in x)" and "Billed (in x)" specifies the total amount of resource usage to be metered and billed respectively in the corresponding billing interval.

Thus, in row 725, the value "16, 10, 21, 4, 5" indicates the usage in number of minutes for VM9, VM10, VM11, VM16 and VM21 respectively in the billing interval "8:00-9:00". It may be observed that the values 16, 10 and 31 corresponding to VM9, VM10 and VM11 are obtained by adding the respective values for CPU usage in columns 712, 713 and 714 of table 700 for the metering intervals (rows 705 and 707) contained in the billing interval. For example, for VM9 in column 712, the CPU usage is calculated as 10 min (in row 705)+6 min (in row 707)=16 minutes. The values for VM16 and VM21 are assumed to be 4 and 5 for illustration. The values for CPU usage for other billing intervals in the other rows may be similarly calculated based on the data/values in table 700.

Billing service 280 then calculates the total amount to be billed in the corresponding billing interval based on the number of minutes to be billed for each VM and the specification of the VM. As the billing interval is of 1 hour (=60 minutes), the minutes are first converted to a fraction of the hour and then multiplied by the specification usage to determine the total amount. For example, for the value "16, 10, 21, 4, 5" in row 725, the total amount is computed as (16/60)*2x+(10/60)*2x+(21/60)*3x+(4/60)*3x+(5/60)*2x=0.533+0.333+1.05+0.2+0.166=2.282 (as shown in columns "Metered (in x)" and "Billed (in x)").

Billing service 280 then bills tenant TE2 by multiplying the value indicated in column "Billed (in x)" and the rate/cost associated with CPU cycles for tenant TE2 for the corresponding billing interval. Though the values in the columns "Metered (in x)" and "Billed (in x)" are shown to be the same, in alternative embodiments, the values may differ based on the billing criteria/policies of the cloud infrastructure provider and/or the specific tenant being billed (here TE2).

The total amount to be billed for CPU usage in the other billing intervals may be similarly calculated (not shown in table 720 for conciseness). Similar calculations may be performed for Memory and Storage usage as shown in tables 730 and 740 respectively. It may be observed that the number of minutes to be billed "16, 10, 21, 4, 5" for Memory in row 735 is similar to the value in row 725 as CPU and Memory usage are calculated similarly (when the VMs are in powered ON state). However, the value "30, 29, 30, 15, 15" in row 745 is different from the value in row 725 as the storage usage is computed based on the existence of the VMs and not their powered ON state.

Thus, the resource usage of different clouds (240, 410, etc.) provisioned in cloud infrastructure 130 is metered and billed to the corresponding owners/tenants. As noted above, customer/tenant (TE2) may wish to validate whether the metering (and in turn, the billing) of the resource usage of their cloud 240 is accurate.

In response to a request to validate metering of cloud 240, testing server 150 provisions test cloud 410 according to the test specification of FIG. 4B. Testing server 150 computes the reference values based on the test specification (of FIG. 4B), receives/collects the metered/measured values (column 770) for test cloud 410 from metering service 270. Testing server 150 then compares the reference values with the measured values to determine the accuracy of metering service 270. The manner in which testing server 150 computes and compares the reference values with the corresponding measured values is described in detail below.

6. Reference and Measured Values

Figure 8A:
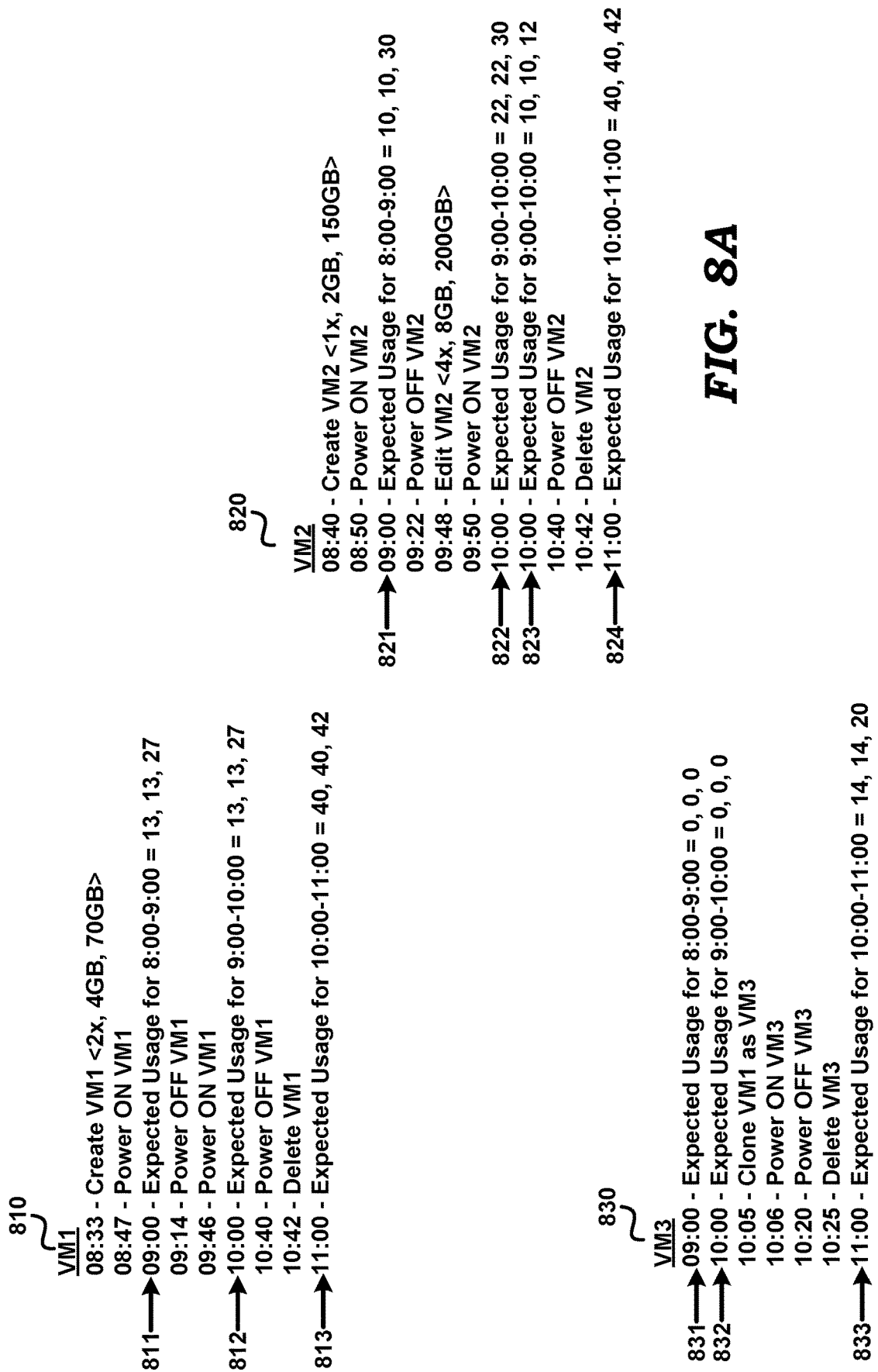
FIG. 8A depicts the manner in which reference values for a test cloud is computed in one embodiment.

FIG. 8A depicts the manner in which reference values for a test cloud (410) is computed in one embodiment. Broadly, testing server 150 simulates the execution of the provisioning operations specified in the test specification of FIG. 4B and then calculates the expected resource usage base on the simulation. The expected CPU and memory usage for a VM is calculated based on the durations when the VM is powered on (that is between the provisioning operations of Power ON and Power OFF of the VM), while the expected storage usage is based on the duration of existence of the VM that is between the provisional operations of Create and Delete of the VM. It may be readily appreciated that the above calculations are similar to the manner in which the usages are metered/billed by metering service 270 and billing server 280.

Data portion 810 depicts the simulation of execution of provisioning operations specified in the test specification of FIG. 4B for VM1 in test cloud 410. The simulation is performed assuming that the start time instance is 8:30. Some of the lines in data portion 810 specify a corresponding time instance (8:33, 8:47, etc.) and the provisioning operation performed in relation to VM1 of test cloud 410 at that time instance. Other lines such as 811-813 specify a corresponding time instance and the expected usage (in minutes of CPU cycles, memory and storage) in the billing interval prior to that time instance. For example, line 811 indicates that at time instance 9:00, the expected usage for the billing interval 8:00-9:00 is 13, 13, 27, that is, 13 minutes of CPU cycles, 13 minutes of memory and 27 minutes of storage. Lines 812 and 813 similarly specify the expected usage for billing intervals 9:00-10:00 and 10:00-11:00 respectively.

Similarly, data portion 820 depicts the simulation of execution of provisioning operations specified in the test specification of FIG. 4B for VM2 in test cloud 410 and also the expected resource usage of VM2 in multiple billing intervals (lines 821-824). It may be noted that lines 822 and 823 specify the respective expected resource usage for VM2<1x, 2 GB, 150 GB> and VM2<4x, 8 GB, 200 GB> in view of the Edit specification provisioning operation executed at time instance 09:48. Data portion 830 similarly depicts the simulation of execution of provisioning operations specified in the test specification of FIG. 4B for VM3 in test cloud 410 and also the expected resource usage of VM3 in multiple billing intervals (lines 831-833).

Testing server 150 computes the reference values for each billing interval based on the expected resource usage indicated in lines 811-813, 821-824 and 831-833. For example, for the billing interval 8:00-9:00, testing server 150 computes the reference value/expected usage for CPU as the sum of the CPU usage for VM1, VM2 and VM3, that is, as in lines 811, 821 and 831. Testing server 150 accordingly computes the reference value for billing interval 8:00-9:00 as (13/60)*2x+(10/60)*1x+(0/60)*2x=0.433+0.166+0=0.599. Testing server 150 similarly computes the reference values for other billing intervals 9:00-10:00 and 10:00-11:00, and also for other resources such as memory and storage.

Testing server 150 then compares the reference values with the measured values to determine the accuracy of metering service 270. The manner in which such comparison may be performed is described below with examples.

Figure 8B:
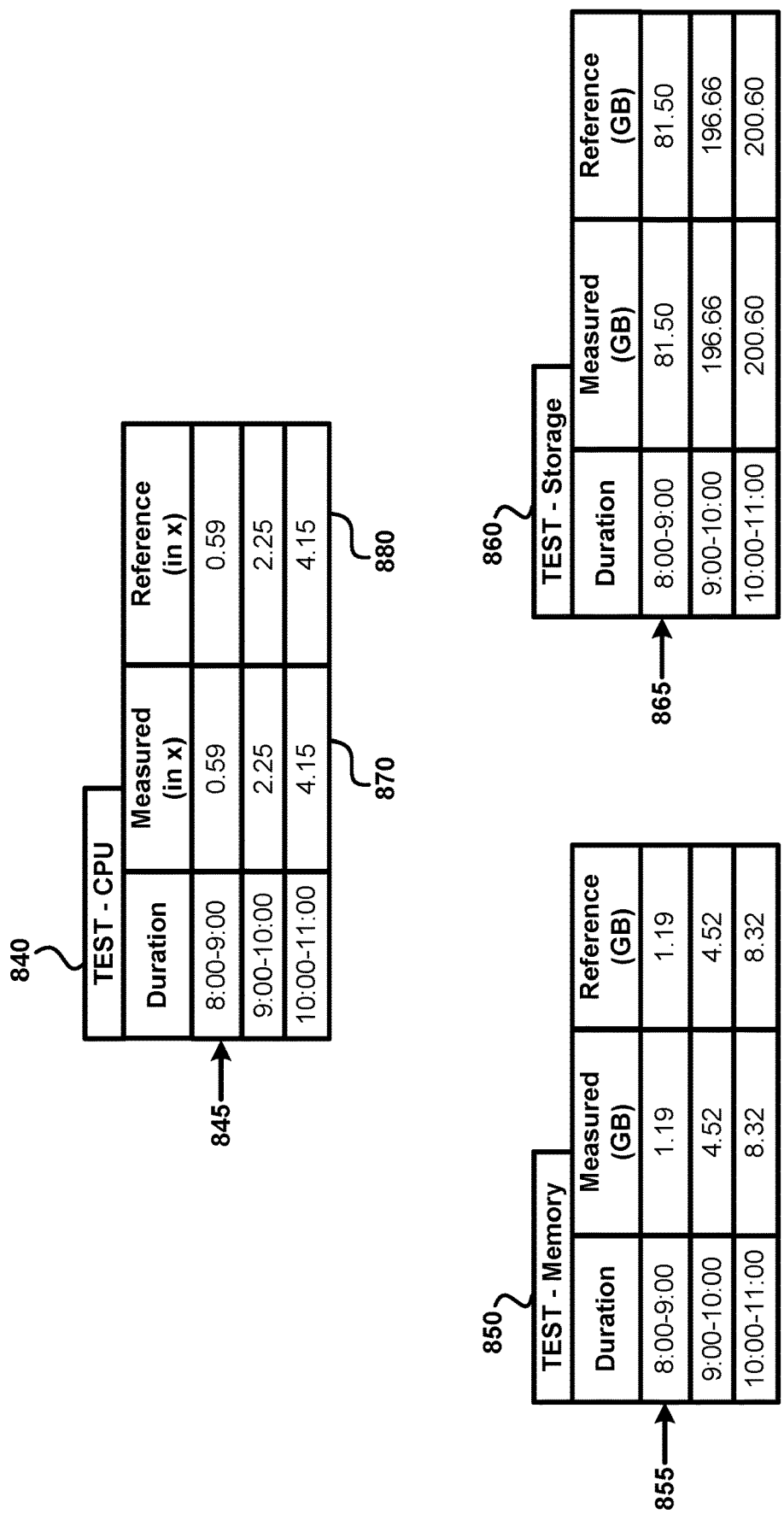
FIG. 8B depicts the manner in which reference values are compared with measured values of a test cloud to validate live metering in one embodiment.

FIG. 8B depicts the manner in which reference values are compared with measured values of test cloud 410 to validate live metering in one embodiment. Tables 840, 850 and 860 specify the manner in which reference values are compared to measured values for the respective usage of CPU cycles, memory and storage.

In table 840, column "Duration" specifies the billing intervals such as 8:00-9:00, 9:00-10:00, etc., with columns 870 "Measured (in x)" and 880 "Reference (in x)" respectively specifying the corresponding measured and reference values in the corresponding billing interval. The values in column 880 are computed based on the expected CPU usage specified in lines 811-813, 821-824 and 831-833. In particular, the reference value in row 845 is computed based on the expected CPU usage specified in lines 811, 821 and 831 as described in detail above.

The values in column 870 may be received from billing service 280 for different billing intervals and are similar to the values in column 770, but for cloud 410 of tenant TEST. Alternatively, the values of table 750 may be received from metering service 270, with testing server 150 then calculating the measured/metered values shown in column 870 similar to the calculations described above with respect to tenant TE2.

Testing server 150 then compares the measured values in column 870 with the corresponding reference values in column 880 to determine whether metering service 270 in cloud infrastructure 130 is accurate. In one embodiment, metering service 270 is determined to be accurate only if the measured values in column 870 match the reference/expected values in column 880 for corresponding billing intervals. As noted above, a match may be determined even if the measured value differs from the reference value by an acceptable margin of error (e.g., ±2% of the reference value).

Testing server 150 may perform similar computations and comparisons for Memory and Storage usage as shown in tables 850 and 860 respectively. In one embodiment, metering service 270 is determined to be accurate only if the measured values match the reference/expected values for all resources such as CPU cycles, memory and storage. In alternative embodiments, the metering service may be determined to be accurate based on the match of measured value and reference values for only a subset of resources (e.g. only CPU cycles).

Thus, testing server 150, provided according to several aspects of the present disclosure, validates live metering services at least to ensure that the measurements captured by the metering service for each cloud/tenant are accurate.

It should be appreciated that the features described above can be implemented in various embodiments as a desired combination of one or more of hardware, software, and firmware. The description is continued with respect to an embodiment in which various features are operative when the software instructions described above are executed.

7. Digital Processing System

Figure 9:
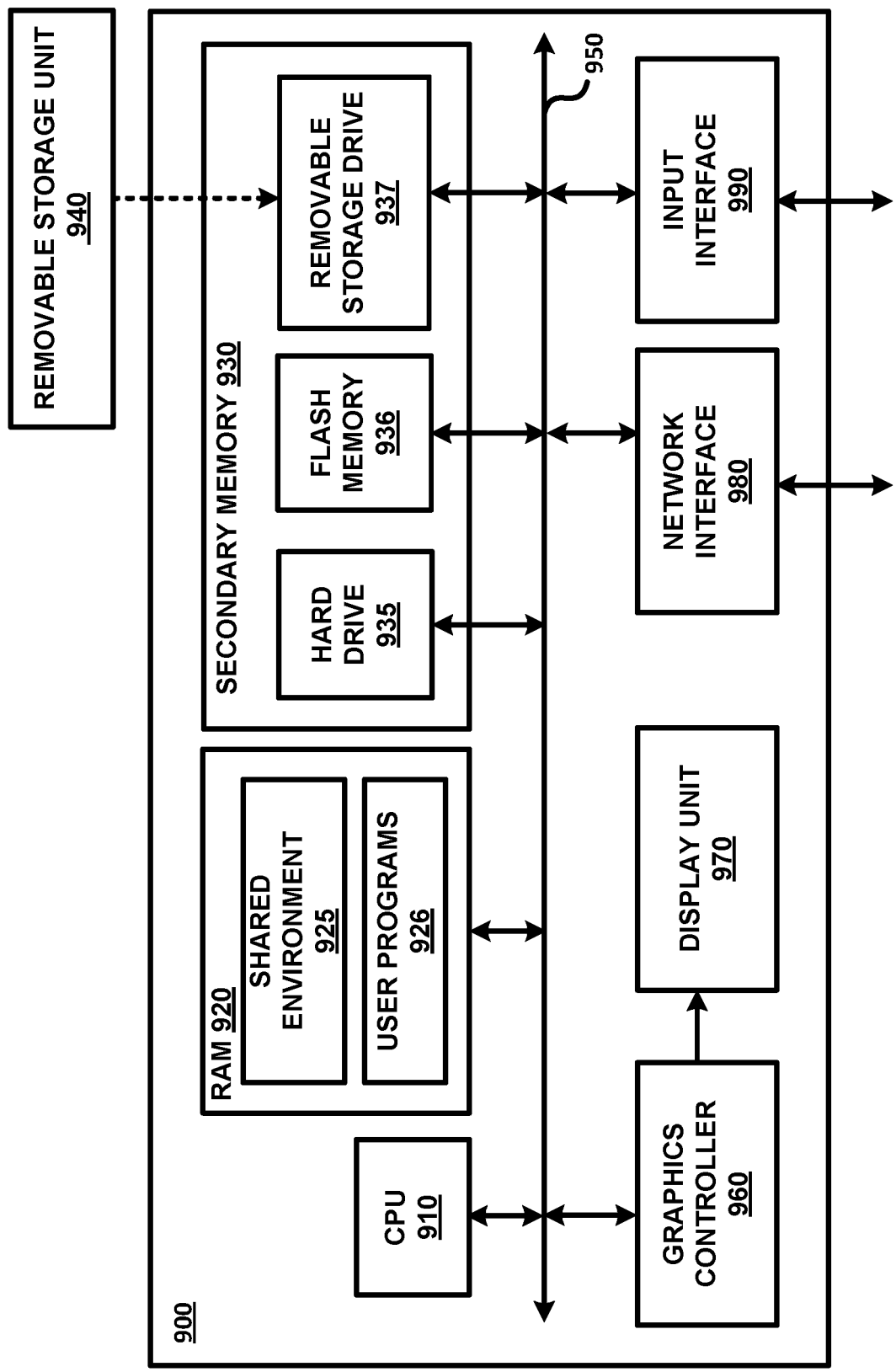
FIG. 9 is a block diagram illustrating the details of a digital processing system in which various aspects of the present disclosure are operative by execution of appropriate executable modules.

FIG. 9 is a block diagram illustrating the details of digital processing system 900 in which various aspects of the present disclosure are operative by execution of appropriate executable modules. Digital processing system 900 may correspond to testing server 150.

Digital processing system 900 may contain one or more processors such as a central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present disclosure. CPU 910 may contain multiple processing units, with each processing unit potentially being designed for a specific task. Alternatively, CPU 910 may contain only a single general-purpose processing unit.

RAM 920 may receive instructions from secondary memory 930 using communication path 950. RAM 920 is shown currently containing software instructions constituting shared environment 925 and/or other user programs 926 (such as other applications, DBMS, etc.). In addition to shared environment 925, RAM 920 may contain other software programs such as device drivers, virtual machines, etc., which provide a (common) run time environment for execution of other/user programs.

Graphics controller 960 generates display signals (e.g., in RGB format) to display unit 970 based on data/instructions received from CPU 910. Display unit 970 contains a display screen to display the images defined by the display signals. Input interface 990 may correspond to a keyboard and a pointing device (e.g., touch-pad, mouse) and may be used to provide inputs. Network interface 980 provides connectivity to a network (e.g., using Internet Protocol), and may be used to communicate with other systems (of FIG. 1) connected to the networks (120).

Secondary memory 930 may contain hard drive 935, flash memory 936, and removable storage drive 937. Secondary memory 930 may store the data (for example, data portions shown in FIGS. 6, 7A/7B and 8A/8B) and software instructions (for example, for implementing the various features of the present disclosure as shown in FIG. 3, etc.), which enable digital processing system 900 to provide several features in accordance with the present disclosure. The code/instructions stored in secondary memory 930 may either be copied to RAM 920 prior to execution by CPU 910 for higher execution speeds, or may be directly executed by CPU 910.

Some or all of the data and instructions may be provided on removable storage unit 940, and the data and instructions may be read and provided by removable storage drive 937 to CPU 910. Removable storage unit 940 may be implemented using medium and storage format compatible with removable storage drive 937 such that removable storage drive 937 can read the data and instructions. Thus, removable storage unit 940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 930. Volatile media includes dynamic memory, such as RAM 920. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 950. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

8. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A method performed associated with a cloud infrastructure hosting a plurality of clouds, said method comprising:
   receiving a request to validate metering of a first cloud during processing of user requests, said first cloud being contained in said plurality of clouds;
   collecting from a metering service of said cloud infrastructure, measured values representing the actual resources consumed by a reference cloud provisioned in said cloud infrastructure in corresponding durations;
   comparing the measured values with corresponding reference values expected during the operation of said reference cloud in the corresponding durations; and
   sending a response to said request based on a result of said comparing.

2. The method of claim 1, further comprising creating a test cloud in said cloud infrastructure, said test cloud designed to consume resources according to a test specification,
   wherein said test cloud is used as said reference cloud and said test specification is used to determine the reference values,
   wherein said test cloud is separate and distinct from said first cloud.

3. The method of claim 2, wherein said creating is performed in response to receipt of said request, wherein said test specification is different from a specification of said first cloud.

4. The method of claim 3, wherein said request is received from a tenant owning said first cloud.

5. The method of claim 2, wherein said test specification specifies usage of resources to model the dynamic usage of resources by said first cloud.

6. The method of claim 5, wherein each of said plurality of clouds and said test cloud comprise of virtual machines provisioned in nodes of said cloud infrastructure, wherein said test cloud comprises a first set of virtual machines,
wherein said test specification specifies provisioning operations for said first set of virtual machines.

7. The method of claim 6, wherein said provisioning operations for a virtual machine comprise create the virtual machine according to a resource definition, power-on the virtual machine, power-off the virtual machine, delete the virtual machine, clone the virtual machine and edit the resource definition of the virtual machine.

8. The method of claim 7, wherein said resources used by a cloud comprise memory allocated to each virtual machine in the cloud, CPU (central processing unit) cycles used by each virtual machine in the cloud, storage allocated to each virtual machine in the cloud, and public IP (Internet Protocol) addresses used by the cloud.

9. The digital processing system of claim 6, wherein said provisioning operations for a virtual machine comprise create the virtual machine according to a resource definition, power-on the virtual machine, power-off the virtual machine, delete the virtual machine, clone the virtual machine and edit the resource definition of the virtual machine.

10. The digital processing system of claim 9, wherein said resources used by a cloud comprise memory allocated to each virtual machine in the cloud, CPU (central processing unit) cycles used by each virtual machine in the cloud, storage allocated to each virtual machine in the cloud, and public IP (Internet Protocol) addresses used by the cloud.

11. The method of claim 2, wherein said metering service measures resource usage in a sequence of metering intervals, wherein resource usage by said first cloud is billed for each billing interval comprising a plurality of metering intervals,
wherein said request is received at a first time instance,
wherein said collecting is performed starting from a next metering interval following said first time instance such that each of the corresponding durations aligns with a respective metering interval of said sequence of metering intervals.

12. A digital processing system comprising:
a random access memory (RAM) to store instructions; and
one or more processors to retrieve and execute said instructions, wherein execution of said instructions causes said digital processing system to perform the actions of:
receiving a request to validate metering of a first cloud during processing of user requests, said first cloud being contained in a plurality of clouds hosted in a cloud infrastructure;
collecting from a metering service of said cloud infrastructure, measured values representing the actual resources consumed by a reference cloud provisioned in said cloud infrastructure in corresponding durations;
comparing the measured values with corresponding reference values expected during the operation of said reference cloud in the corresponding durations; and
sending a response to said request based on a result of said comparing.

13. The digital processing system of claim 12, further performing the actions of creating a test cloud in said cloud infrastructure, said test cloud designed to consume resources according to a test specification,
wherein said test cloud is used as said reference cloud and said test specification is used to determine the reference values,
wherein said test cloud is separate and distinct from said first cloud.

14. The digital processing system of claim 13, wherein said digital processing system performs said creating in response to receipt of said request, wherein said test specification is different from a specification of said first cloud.

15. The digital processing system of claim 14, wherein said request is received from a tenant owning said first cloud.

16. The digital processing system of claim 13, wherein said test specification specifies usage of resources to model the dynamic usage of resources by said first cloud.

17. The digital processing system of claim 16, wherein each of said plurality of clouds and said test cloud comprise of virtual machines provisioned in nodes of said cloud infrastructure, wherein said test cloud comprises a first set of virtual machines,
wherein said test specification specifies provisioning operations for said first set of virtual machines.

18. The digital processing system of claim 13, wherein said metering service measures resource usage in a sequence of metering intervals, wherein resource usage by said first cloud is billed for each billing interval comprising a plurality of metering intervals,
wherein said request is received at a first time instance,
wherein said digital processing system performs said collecting starting from a next metering interval following said first time instance such that each of the corresponding durations aligns with a respective metering interval of said sequence of metering intervals.

19. A non-transitory machine readable medium storing one or more sequences of instructions, wherein execution of said one or more instructions by one or more processors contained in a digital processing system causes said digital processing system one or more processors to perform the actions of:
creating a test cloud in a cloud infrastructure, said test cloud designed to consume resources according to a test specification;
collecting from a metering service of said cloud infrastructure, measured values representing the actual resources consumed by said test cloud in corresponding durations;
computing based on said test specification, reference values representing the resources expected to be consumed by said test cloud in corresponding durations; and
determining that the metering service is accurate if the measured values match the expected values in the corresponding durations.

20. The non-transitory machine readable medium of claim 19, wherein said creating, said collecting, said computing and said determining are performed in response to receiving a request to validate metering of a first cloud during processing of user requests, wherein said first cloud is hosted in said cloud infrastructure and is separate and distinct from said test cloud.

* * * * *